United States Patent
Porzio et al.

(10) Patent No.: US 12,530,153 B2
(45) Date of Patent: *Jan. 20, 2026

(54) TECHNIQUES FOR ATOMIC WRITE OPERATIONS

(71) Applicant: Micron Technology, Inc., Boise, ID (US)

(72) Inventors: Luca Porzio, Casalnuovo (IT); Christian M. Gyllenskog, Meridian, ID (US); Dionisio Minopoli, Frattamaggiore (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/896,777

(22) Filed: Sep. 25, 2024

(65) Prior Publication Data

US 2025/0094085 A1 Mar. 20, 2025

Related U.S. Application Data

(63) Continuation of application No. 17/647,699, filed on Jan. 11, 2022, now Pat. No. 12,112,064.

(60) Provisional application No. 63/266,150, filed on Dec. 29, 2021.

(51) Int. Cl.
*G06F 3/06* (2006.01)

(52) U.S. Cl.
CPC ......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 2212/1032; G06F 2212/7207; G06F 2212/7209; G06F 3/0619; G06F 12/0246; G11C 16/10
USPC ................................................. 711/154, 100
See application file for complete search history.

(56) References Cited

U.S. PATENT DOCUMENTS

| | | | |
|---|---|---|---|
| 9,170,938 B1 * | 10/2015 | Walsh | G06F 3/0619 |
| 2011/0085657 A1 | 4/2011 | Matthews, Jr. | |
| 2013/0073821 A1 | 3/2013 | Flynn et al. | |
| 2014/0281145 A1 * | 9/2014 | Tomlin | G06F 12/1081 711/103 |
| 2014/0325115 A1 | 10/2014 | Ramsundar et al. | |
| 2018/0136859 A1 | 5/2018 | Hsieh et al. | |
| 2018/0189154 A1 | 7/2018 | Zhu et al. | |
| 2019/0179783 A1 | 6/2019 | Laughton et al. | |
| 2019/0205052 A1 | 7/2019 | Harris et al. | |

(Continued)

*Primary Examiner* — Hosain T Alam
*Assistant Examiner* — Zubair Ahmed
(74) *Attorney, Agent, or Firm* — Holland & Hart LLP

(57) ABSTRACT

Methods, systems, and devices for techniques for atomic write operations are described. A memory system may determine a set of pages for an atomic write operation in which data associated with a write command is linked together for writing to a non-volatile memory. The memory system may write, to the non-volatile memory, metadata that indicates the set of pages is associated with the atomic write operation. Based on the metadata, the memory system may determine whether each page of the set of pages has been written with data for the atomic write operation. The memory system may then communicate to a host system an indication of a completion status for the atomic write operation based on determining whether each page of the set of pages has been written with the data for the atomic write operation.

20 Claims, 8 Drawing Sheets

(56) References Cited

U.S. PATENT DOCUMENTS

2020/0264800 A1 8/2020 Wysocki et al.
2023/0038857 A1 2/2023 Tomlin

* cited by examiner

TECHNIQUES FOR ATOMIC WRITE OPERATIONS

CROSS REFERENCE

The present Application for Patent is a continuation of U.S. patent application Ser. No. 17/647,699 by PORZIO et al., entitled "TECHNIQUES FOR ATOMIC WRITE OPERATIONS," filed Jan. 11, 2022, which claims the benefit of U.S. Provisional Patent Application No. 63/266,150 by PORZIO et al., entitled "TECHNIQUES FOR ATOMIC WRITE OPERATIONS," filed Dec. 29, 2021, each of which is assigned to the assignee hereof, and each of which is expressly incorporated by reference in its entirety herein.

FIELD OF TECHNOLOGY

The following relates generally to one or more systems for memory and more specifically to techniques for atomic write operations.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
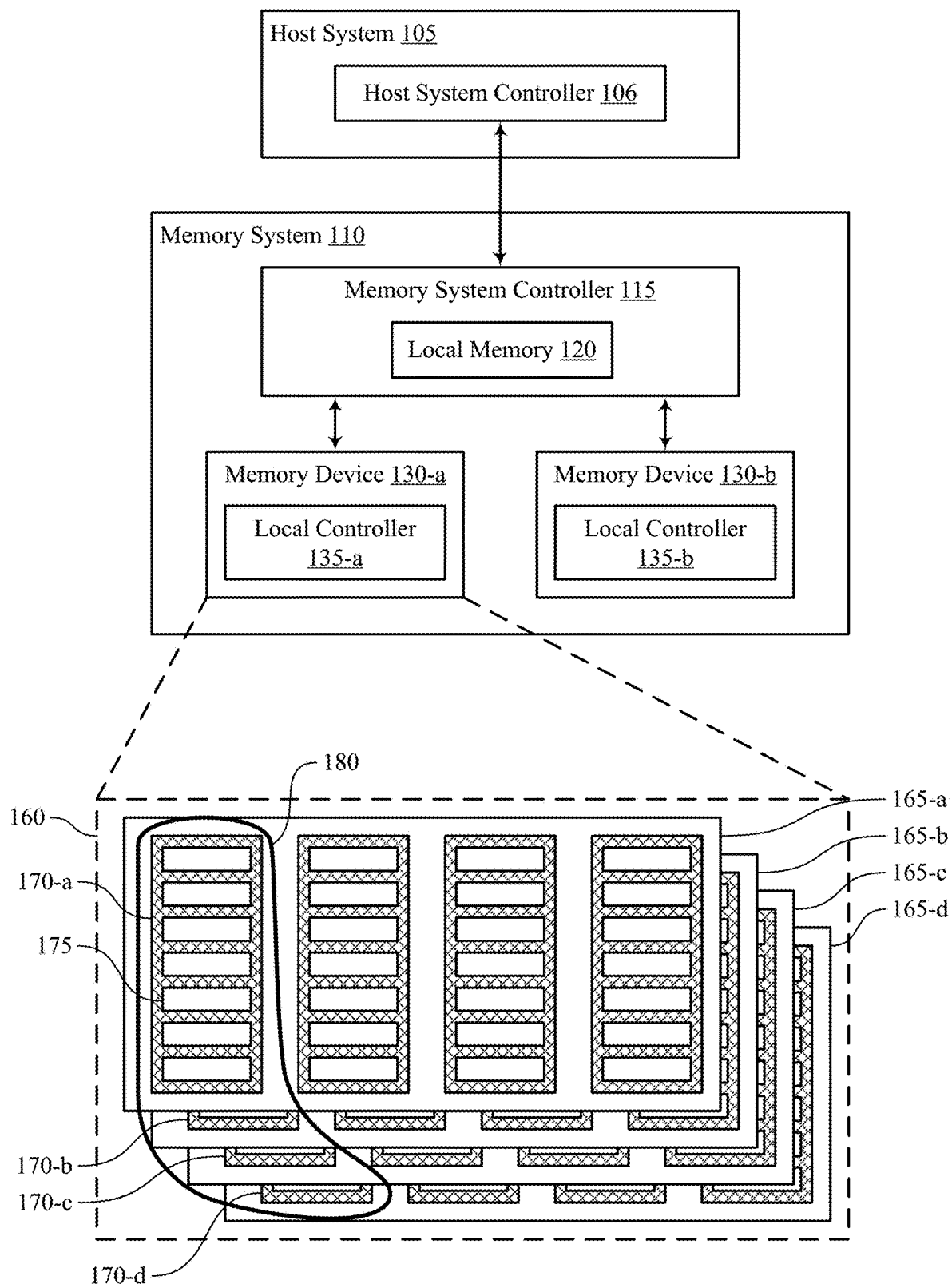
FIG. 1 illustrates an example of a system that supports techniques for atomic write operations in accordance with examples as disclosed herein.

A memory system may include a volatile memory that the memory device operates as a cache for a main memory (e.g., a non-volatile memory) to improve latency without sacrificing advantages (e.g., power efficiency, density, non-volatility) of the main memory. To prevent data loss in the event of a failure event (e.g., an unexpected or expected power loss), the host system may send a first command that instructs the memory system to save the data in the cache to the main memory, then a second command that instructs the memory system to save address information for the data to the main memory. After sending each command, the host system may suspend traffic to the memory system until the memory system confirms that the respective information for that command has been successfully saved to the main memory. But suspending traffic to the memory system may reduce system bandwidth and throughput, among other disadvantages.

According to the techniques described herein, a system may improve performance by implementing a protocol for atomic write operations that allows the memory system to ensure that both cached data and associated address information is saved to the main memory without the host device suspending traffic. An atomic write operation may refer to a write operation in which the data associated with a write command is linked together for writing to the main memory. A system that initiates an atomic write operation may consider the atomic write operation incomplete until all data associated with the write operation has been written to the main memory.

As part of the protocol, the host system may send to the memory system one or more write commands for an atomic write operation, which may be referred to as atomic write commands. Before writing data associated with the atomic write operation to the main memory, the memory system may assign an identifier to the atomic write operation and store the identifier, potentially along with other metadata for the atomic write operation, for at least some, if not each, page of the main memory implicated in the atomic write operation. A page of the main memory may be implicated in an atomic write operation if the page is selected for storing data associated with the atomic write operation. As the atomic write operation proceeds (e.g., as data and corresponding address information are written to pages of the main memory), the memory system may update validity flags for the pages implicated in the atomic write operation. For example, after writing data to a page (and after writing the address information for that data), the memory system may update the validity flag corresponding to that page to indicate that the page has been written with valid data.

If the memory device experiences an event, such as a failure event (e.g., unintentional power loss or drop or intentional power loss or drop), the memory system may use the stored identifiers for the atomic write operation to determine which pages were implicated in the atomic write operation. The memory system may then check the validity flags for the pages to determine whether the atomic write operation was successfully completed before the failure event.

Figure 2:
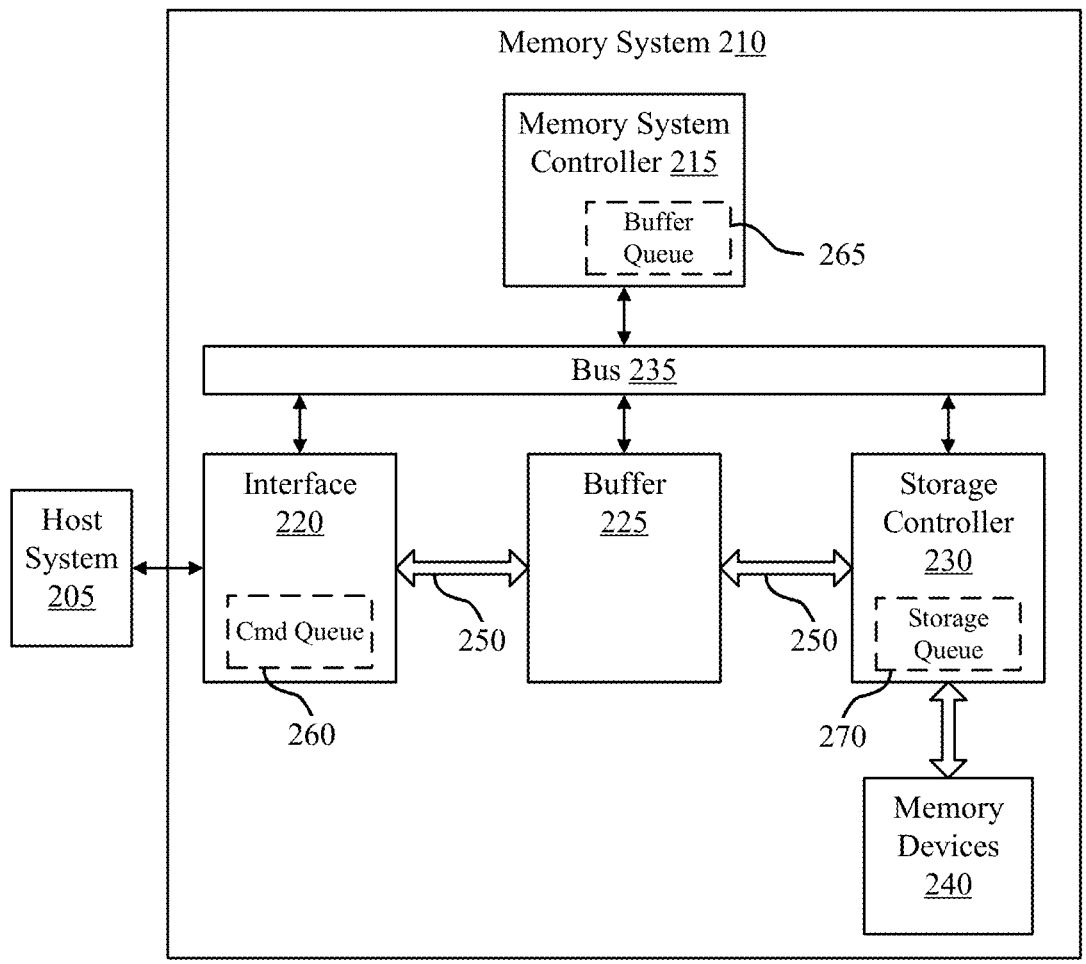
FIG. 2 illustrates an example of a system that supports techniques for atomic write operations in accordance with examples as disclosed herein.

Features of the disclosure are initially described in the context of systems, devices, and circuits with reference to FIGS. 1 and 2. Features of the disclosure are described in the context of a process flow and a flow chart with reference to FIGS. 3 and 4. These and other features of the disclosure are further illustrated by and described in the context of an apparatus diagram and flowchart that relate to techniques for atomic write operations with reference to FIGS. 5-8.

FIG. 1 illustrates an example of a system 100 that supports techniques for atomic write operations in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity (e.g., using a validity table), and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support techniques for atomic write operations. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system 110 may operate the local memory 120 as a cache for a main memory, which may include memory distributed across one or more of the memory devices 130. The cache may be a volatile memory that provides faster access than the main memory, which may be a non-volatile memory. To improve performance (e.g., to increase access speed, to accommodate latency requirements of the host system 105), the memory system controller 115 may confirm to the host system 105 that write operations requested by the host system 105 are complete even though the data associated with the write operations has not yet been saved from the cache to the main memory. But such premature confirmation may be problematic if the memory system 110 experiences a failure event before all the data associated with the write operations has been saved to the main memory. For example, the unsaved data in the volatile cache may be lost but, due to the premature confirmation, the host system 105 may be unaware of the loss. Thus, only a fraction of the data may be saved to the main memory even though the memory system 110 confirmed that all the data was saved.

To address this issue, the host system 105 may issue commands that instruct the memory system 110 delay confirmation until all data associated with the commands has been saved to the main memory. For example, the host system 105 may issue one or more write commands followed by a sync_cache command, which may instruct the memory system 110 to delay confirmation until all the data in the cache has been saved to the main memory. After receiving the confirmation for the sync_cache command, the host system 105 may issue a write command with a force unit access (FUA) bit set, which may instruct the memory system 110 to delay confirmation until all the address information for the data associated with the sync_cache command has been saved to main memory. The address information may include information for managing the data associated with the atomic write operation, which may be referred to as atomic data. For example, the address information, may include L2P address information for an L2P table that maps logical addresses, which may be used by the host system 105, to physical addresses (of the main memory), which may be used by the memory system 110. Address information for an atomic write operation may also be referred to as system file information or other suitable terminology.

After issuing the sync_cache command the host system 105 may pause traffic to the memory system 110 until confirmation for the sync_cache command is received, and after issuing the write (FUA) command the host system 105 may pause traffic to the memory system 110 until confirmation for the write (FUA) command has been received. If the memory system 110 does not confirm either command, the host system 105 may assume that none of the data associated with the commands has been saved to the main memory. If the memory system 110 confirms both commands, the host system 105 may assume that all the data associated with the command has been saved to the main memory. Thus, the system 100 may use sync_cache and write (FUA) commands to avoid partial writes (e.g., writes that only save a fraction of the atomic data to be saved to main memory).

But use of sync_cache and write (FUA) commands, or similar commands, may decrease the performance of the system 100 because the host system 105 suspends traffic until receipt of confirmation. According to the techniques described herein, the system 100 may use a protocol for an atomic write operation that allows the 100 to avoid partial writes without the host system 105 suspending traffic.

As part of the protocol, the host system 105 may issue an atomic write command for the atomic write operation. The atomic write command may be formatted to indicate that the data associated with the atomic write command is linked together for writing to the main memory. Upon receipt of the atomic write command for the atomic operation, the memory system controller 115 may assign an identifier to the atomic write operation (e.g., to differentiate the atomic write operation from other atomic write operations) and write the identifier, along with the size of the atomic write operation, as metadata for each page (or other unit of granularity) of the main memory selected for the atomic write operation. The size of the atomic write operation may be referred to as the atomic length and may be the total amount of atomic data indicated by the atomic write commands. The identifier for an atomic write operation may be referred to as the atomic identifier. The metadata for the atomic write operation, which may be referred to as atomic metadata, may be written to the main memory so that the atomic metadata is impervious to adverse events, such as failures or power loss.

In the event of a failure event, the memory system 110 may use the atomic metadata to determine whether the atomic write operation was successfully completed before the failure event. For example, the memory system 110 may identify the pages of the main memory that have matching atomic metadata (e.g., the same atomic identifiers) and determine (e.g., by accessing a page validity table) whether all of the pages have been successfully written. If all pages implicated in the atomic write operation have been successfully written, the memory system 110 may indicate (e.g., may send an indication) to the host system 105 that the atomic write operation was completed. If one or more of the pages implicated in the atomic write operation has not been successfully written, the memory system may indicate (e.g., may send an indication) to the host system 105 that the atomic write operation was not completed. Thus, the protocol may allow the system 100 to avoid partial writes without the host system 105 suspending traffic during an atomic write operation, which may improve performance.

FIG. 2 illustrates an example of a system 200 that supports techniques for atomic write operations in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on or in response to the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system 210 may operate the buffer 225, or another local memory, as a cache for a main memory included in one or more of the memory devices 240. If the memory system 210 receives a set of write commands (e.g., one or more write commands) for an atomic write operation, the memory system 210 may copy data implicated in the atomic write operation from the cache to the main memory (e.g., so that the data is preserved in the event of a power loss). The atomic write operation may be considered as completed (e.g., successful) if all the atomic data (which may include address information) implicated in the atomic write operation has been written to a location, such as the main memory, and may be considered as incomplete (e.g., unsuccessful) if any of the data implicated in the atomic write operation is not written to the location, such as the main memory. To ensure that an atomic write operation is accurately flagged as complete or incomplete, the memory system 210 may store information, such as metadata, for managing the atomic write operation. The memory system 210 may store the metadata in the main memory so that the metadata is available even if the memory system 210 experiences a failure event (e.g., power loss).

Figure 3:
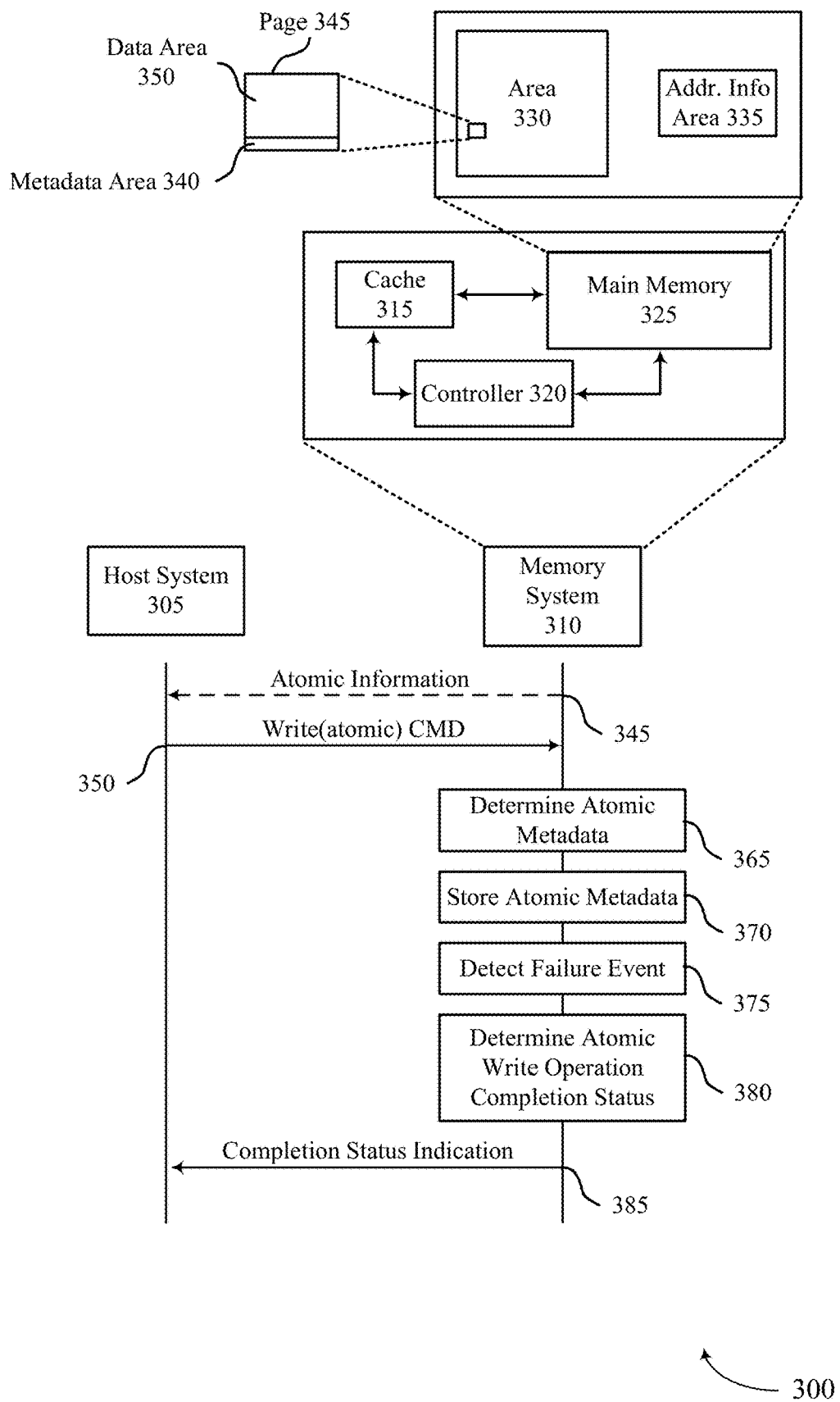
FIG. 3 illustrates an example of a process flow that supports techniques for atomic write operations in accordance with examples as disclosed herein.

FIG. 3 illustrates an example of a process flow 300 that supports techniques for atomic write operations in accordance with examples as disclosed herein. The process flow 300 may be implemented by a host system 305 and a memory system 310. The host system 305 may be an example of host system 105 or a host system 205 as described with reference to FIGS. 1 and 2, respectively. The memory system 310 may be an example of a memory system 110 or a memory system 210 as described with reference to FIGS. 1 and 2, respectively. According to the techniques described here, the memory system 310 may use atomic metadata to manage an atomic write operation initiated by the host system 305.

Aspects of the process flow 300 may be implemented by a controller, among other components. Additionally or alternatively, aspects of the process flow 300 may be implemented as instructions stored in memory (e.g., firmware stored in a memory coupled with the memory subsystem). For example, the instructions, if executed by a controller (e.g., the controller 320), may cause the controller to perform the operations of the process flow 300.

The memory system 310 may include a cache 315 and a main memory 325. In some examples, the cache 315 is a volatile memory and the main memory 325 is a non-volatile memory. The main memory 325 may include different areas or portions that are configured for storing different types of information. For example, the main memory 325 may include an area 330 for storing data and metadata and may include an address information area 335 for storing address information. The area 330 may include a quantity of pages 345, each of which may include a data area 350 that is configured to store data and a metadata area 340 that is configured to store metadata for the page 345. However, other configurations of the main memory 325 are contemplated and are within the scope of the present disclosure.

The memory system 310 may also include a controller 320, which may be configured to control various operations and aspects of the cache 315 and the main memory 325.

To avoid data loss in the event of an unexpected failure (e.g., to avoid partial writes), the host system 305 may initiate an atomic write operation. The host system 305 may select one or more parameters for the atomic write operation based on or in response to atomic information received at 345 from the memory system 310. The atomic information may include one or more messages (e.g., descriptors) that indicate constraints of the memory system 310. For example, the atomic information may include a maximum atomic transfer length message that indicates the maximum amount of data (e.g., quantity of logical blocks) supported by the memory system 310 for an atomic write operation. The atomic information may additionally or alternatively include an atomic transfer length granularity message that indicates the minimum granularity of data supported by the memory system 310 for an atomic write command. If the atomic transfer length granularity is set (e.g., a value other than 0), the transfer length of an atomic write operation may be limited or restricted to a multiple of the atomic transfer length granularity. The atomic information may additionally or alternatively include an alignment message that indicates an address limitation for atomic write operations. For example, the alignment message may indicate that one or more addresses for an atomic write operation (e.g., the starting address or LBA for each atomic write command) must be a multiple of an integer indicated by the alignment message.

The host system 305 may initiate an atomic write operation by sending an atomic write command to the memory system 310. For example, the host system 305 may send atomic write command (denoted 'Write(atomic) CMD') at 350. The atomic write command may be formatted to indicate that the atomic write command is an atomic write command (as opposed to a non-atomic write command).

An atomic write command may indicate one or more various parameters for the atomic write operation. For example, an atomic write command may indicate one or more addresses (e.g., LBAs) associated with the atomic write operation, the atomic length of the atomic write operation, or both, among other parameters. Parameters of the atomic write commands (e.g., the transfer lengths for the atomic write commands, the starting addresses for the atomic write commands), parameters of the atomic write operation (e.g., the transfer length of the atomic write operation), or both, may be based on (e.g., in accordance with) the parameters of the memory system 310 as indicated by the atomic information received at 345.

An atomic write command may be accompanied by or associated with a set of atomic data for the atomic write command. Upon receipt of the atomic write command and the data accompanying the atomic write command, the memory system 310 may write the data to the cache 315. The memory system 310 may also select a set of pages 345 for the atomic write operation.

At 365, the memory system 310 may determine atomic metadata for the atomic write operation. For example, the memory system 310 may determine an identifier for the atomic write operation. The memory system 310 may also determine the transfer length of the atomic write operation (e.g., the memory system 310 may determine the total amount of data that accompanied the atomic write commands).

The memory system 310 may increment a counter for each new atomic write operation initiated by the host system 305. In some examples, the memory system 310 may determine the identifier based on (e.g., as a function of) or in response to an LBA for the atomic write operation, the value of a counter, or both. For example, the memory system 310 may determine the identifier as the starting LBA (e.g., the first LBA indicated for the atomic write operation). Alternatively, the memory system 310 may determine the identifier as the result of a logical operation on the starting LBA (e.g., the first LBA indicated for the atomic write operation) and the counter value (e.g., an integer) for that atomic write operation. For example, the memory system 310 may perform a logical XOR operation on the starting LBA and the counter value to determine the identifier. Determining the identifier for the atomic write operation by XORing the starting LBA with the counter value may allow the memory system 310 to distinguish between atomic write operations that have the same starting LBA.

At 370, the memory system 310 may store the atomic metadata in the main memory 325 (e.g., in the metadata areas 340). In some examples, the atomic metadata may be stored on a per-page basis meaning that the atomic metadata for the atomic write operation (e.g., the identifier and the transfer length) is written for each page implicated in the atomic write operation. That is, each page 345 implicated in the atomic write operation may have respective atomic metadata stored in the metadata area 340 of that page 345. The memory system 310 may store the atomic metadata before writing any of the atomic data for the atomic write operation to the main memory 325. After writing the atomic metadata, the memory system 310 may begin copying atomic metadata for the atomic write operation from the cache 315 to the main memory 325.

At 375, the memory system 310 may detect that a failure event has occurred since beginning the atomic write operation. For example, the memory system 310 may determine that a power loss occurred after the atomic metadata was stored in the main memory 325. At 380, the memory system 310 may use the atomic metadata to determine whether the atomic write operation was completed before the failure event. For example, the memory system 310 may use the atomic metadata to determine whether each page implicated by the atomic write operation was written (e.g., with atomic data). At 385, the memory system 310 may send to the host system 305 a message that indicates the completion status of the atomic write operation.

Thus, the memory system 310 may use atomic metadata to effectively manage an atomic write operation initiated by the host system 305.

Figure 4:
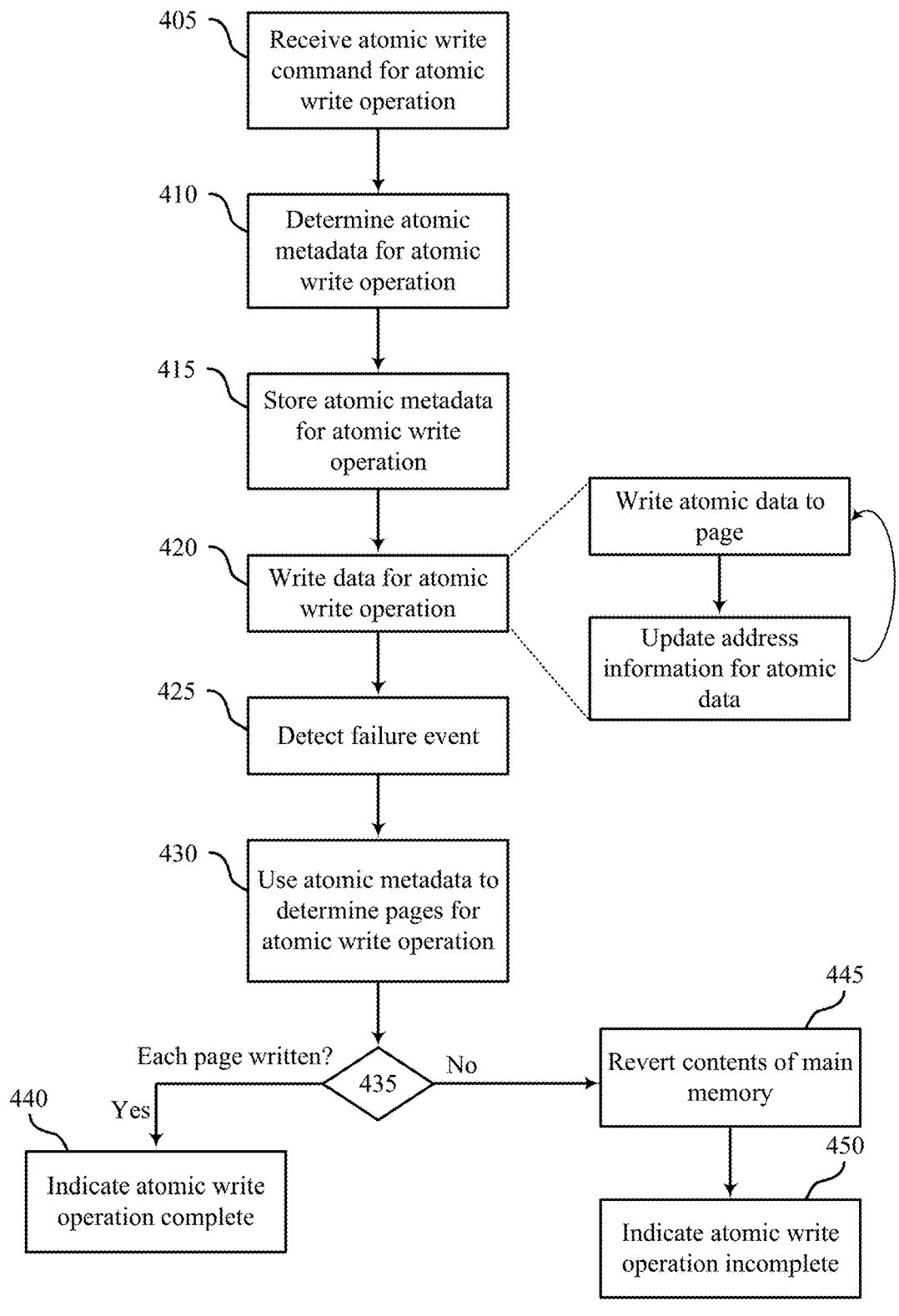
FIG. 4 illustrates an example of a flow chart that supports techniques for atomic write operations in accordance with examples as disclosed herein.

FIG. 4 illustrates an example of a flow chart 400 that supports techniques for atomic write operations in accordance with examples as disclosed herein. The flow chart 400 may be implemented by a memory system. The memory system may be an example of a memory system 110, a memory system 210, or a memory system 310 as described with reference to FIGS. 1, 2, and 3, respectively.

Aspects of the flow chart 400 may be implemented by a controller, among other components. Additionally or alternatively, aspects of the flow chart 400 may be implemented as instructions stored in memory (e.g., firmware stored in a memory coupled with the memory subsystem). For example, the instructions, if executed by a controller (e.g., the controller 320), may cause the controller to perform the operations of the flow chart 400.

At 405, an atomic write command for an atomic write operation may be received. For example, the memory system 310 may receive an atomic write command from the host system 305. In some examples, the atomic write operation, the atomic write command, or both, may comply with various constraints indicated by the memory system 310. For example, the total amount of atomic data communicated to the memory system 310 for the atomic write operation may be less than the maximum transfer length (e.g., as indicated by a maximum transfer length message). Additionally or alternatively, the granularity of atomic data communicated with an atomic write command may be a multiple of the minimum granularity (e.g., as indicated by the atomic transfer length granularity message). Additionally or alternatively, one or more addresses for the atomic write operation (e.g., the starting LBA for the atomic write command) may be a multiple of a same integer (e.g., as indicated by an alignment message).

An atomic write command may be associated with (e.g., accompanied by) a corresponding set of data for the atomic write operation. Based on or in response to the atomic write command, the memory system may write the atomic data to a cache (e.g., the cache 315) in preparation for the atomic write operation. Additionally, the memory system may increment a counter value (e.g., the value of a counter used to track the quantity of atomic write operations initiated by the host system). The memory system may also select a set of pages for the atomic write operation. In some examples, the memory system may perform garbage collection to free up pages that the memory system can select for the atomic write operation.

At 410, atomic metadata for the atomic write operation may be determined. For example, the memory system 310 may determine an identifier for the atomic write operation, a transfer length for the atomic write operation, or both, among other atomic metadata. In some examples, the identifier may be the result of XORing an LBA (e.g., the starting LBA) for the atomic write operation and the counter value.

At 415, the atomic metadata for the atomic write operation may be stored. For example, the memory system 310 may write the identifier and the transfer length for the atomic operation to the main memory (e.g., in metadata areas 340). In some examples, the memory system 310 may write the atomic metadata for each page of the set of pages implicated in the atomic write operation. Thus, each page 350 implicated in the atomic write operation may have respective metadata (e.g., the identifier and the atomic transfer length) that matches the metadata for the other pages 350 implicated in the atomic write operation. Put another way, the atomic metadata for each page 350 may indicate that the page 350 is implicated in the atomic write operation.

At 420, at least some atomic data for the atomic write operation may be written to the main memory. For example, the memory system 310 may copy at least some the atomic data associated with the atomic write command from the cache 315 to the main memory 325 (e.g., indirectly through the controller 320 or directly from cache 315 to the main memory 325). Copying atomic data may include reading the atomic data from the cache 315 and writing the atomic data to a page of the main memory 325. After writing the atomic data to a page, the memory system 310 may update a physical validity table to indicate that the page has been written (e.g., the memory system 310 may set a validity bit for the page). The memory system 310 may also update an L2P table with address information to indicate the logical address (e.g., LBA) associated with the atomic data stored at the physical address. Thus, the memory system may write address information for the atomic data by updating an L2P table that indicates mappings between logical addresses (e.g., LBAs) and physical addresses (e.g., for pages).

At 425, a failure event may be detected. For example, the memory system 310 may detect that a power loss occurred after the atomic metadata for the atomic write operation was written to the main memory 325. In such a scenario, the completion status of the atomic write operation may be unknown. To determine the completion status, the memory system may perform the operations at 430 and 435.

At 430, the atomic metadata for the atomic write operation may be used to determine the pages implicated in the atomic write operation. For example, the memory system 310 may reference the metadata areas 340 to identify pages 350 of the main memory 325 that have the same metadata (e.g., the same identifier). The memory system 310 may continue to reference the metadata areas 340 for pages 350 implicated in the atomic write operation until the memory system 310 identifies enough pages 350 to store the atomic transfer length. For instance, assuming a page size of 4 kB and an atomic transfer length of 400 kB, the memory system 310 may continue to look for pages implicated in the atomic write operation until the memory system 310 identifies one hundred pages (collectively capable of storing 400 kB) for the atomic write operation. Thus, the memory system 310 may use the atomic length of the atomic write operation to ensure that all the pages for the atomic write operation have been identified. After identifying the set of pages for the atomic write operation, the memory system 310 may proceed to 435.

At 435, it may be determined whether each page of the set of pages for the atomic write operation has been written. For example, the memory system 310 may determine whether each page of the set of pages for the atomic write operation has been written. To do so, the memory system 310 may reference a physical validity table that indicates the validity status of pages in the main memory 325. If the physical validity table indicates (e.g., via a validity bit) that a page stores valid data, the memory system 310 may determine that the page has been written with atomic data for the atomic write operation. If the physical validity table indicates (e.g., via a validity bit) that a page stores invalid data, the memory system 310 may determine that the page has not been written with atomic data for the atomic write operation.

If, at 435, the memory system determines that each page for the atomic write operation has been written, the memory system may proceed to 440 and send an indication to the host system 305 that the atomic write operation completed. If, at 435, the memory system determines that at least one page for the atomic write operation has not been written, the memory system may proceed to 445. At 445, at least some content in the main memory 325 may be reverted (e.g., to the content that was in the main memory 325 before the atomic write operation). For example, the memory system 310 may replace the address information for the pages implicated in the atomic write operation with address information that was previously stored for the pages. The memory system 310 may also discard the contents of the pages written with the atomic data. In some examples, (e.g., if the memory system 310 performed garbage collection to free up the pages implicated in the atomic write procedure), the memory system 310 may restore the content previously stored (e.g., before garbage collection) at the pages. At 450, a message may be sent indicating that that the atomic write operation did not complete. For example, the memory system 310 may send an indication to the host system 305 that the atomic write operation was not completed.

Thus a memory system may use atomic metadata to inform a host system of the completion status of an atomic write operation.

Figure 5:
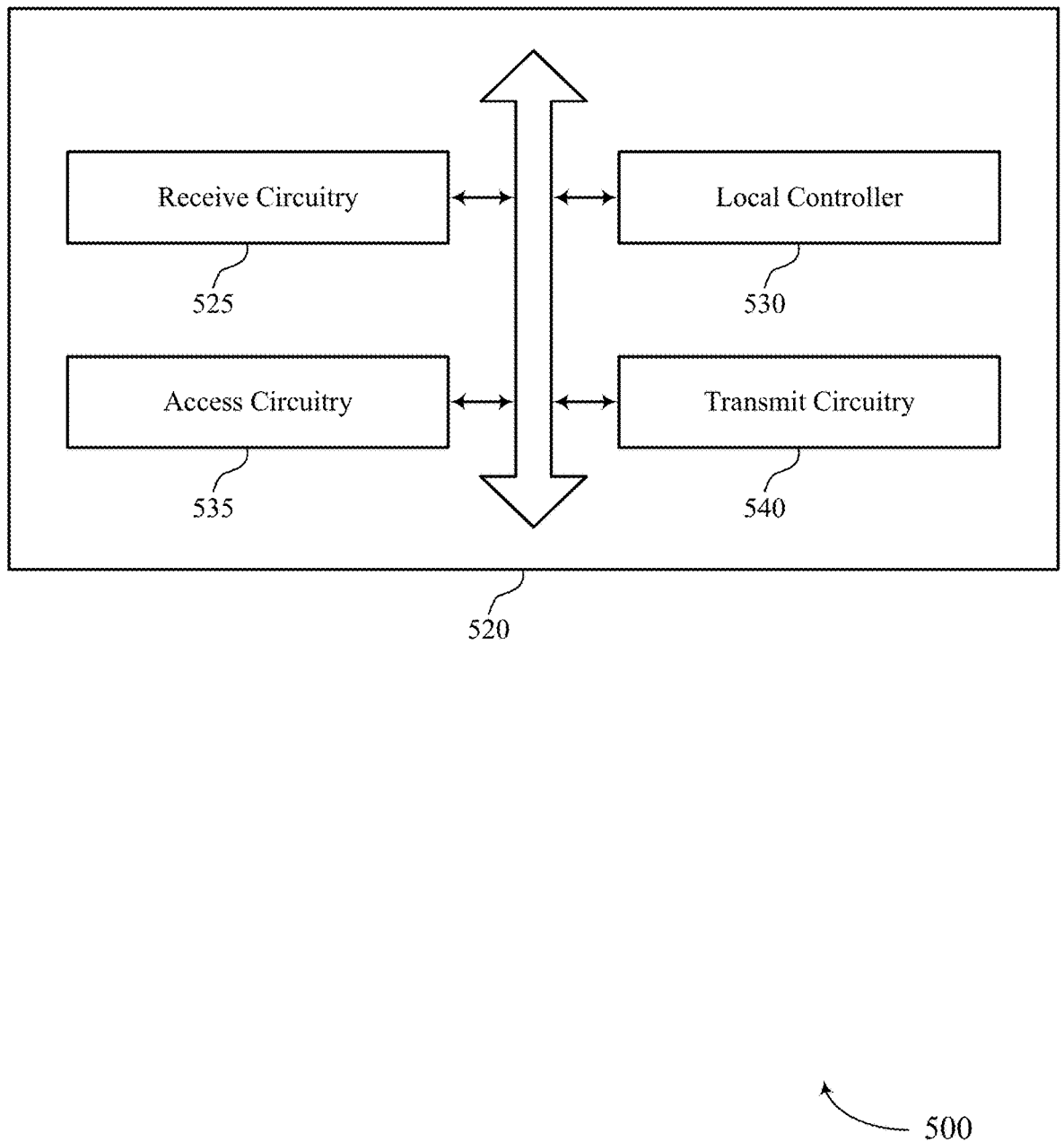
FIG. 5 shows a block diagram of a memory system that supports techniques for atomic write operations in accordance with examples as disclosed herein.

FIG. 5 shows a block diagram 500 of a memory system 520 that supports techniques for atomic write operations in accordance with examples as disclosed herein. The memory system 520 may be an example of aspects of a memory system as described with reference to FIGS. 1 through 4. The memory system 520, or various components thereof, may be an example of means for performing various aspects of techniques for atomic write operations as described herein. For example, the memory system 520 may include a receive circuitry 525, a local controller 530, an access circuitry 535, a transmit circuitry 540, or any combination thereof. Each of these components may communicate, directly or indirectly, with one another (e.g., via one or more buses).

The receive circuitry 525 may be configured as or otherwise support a means for receiving a write command for an atomic write operation in which data associated with the write command is linked together for writing to a non-volatile memory. The local controller 530 may be configured as or otherwise support a means for determining, based at least in part on receiving the write command, a set of pages of the non-volatile memory for the atomic write operation and metadata for the set of pages that indicates the set of pages are for the atomic write operation. The access circuitry 535 may be configured as or otherwise support a means for writing, to the non-volatile memory, the metadata that indicates the set of pages are for the atomic write operation.

In some examples, the metadata includes an identifier for the atomic write operation and an amount of data for the atomic write operation.

In some examples, the local controller 530 may be configured as or otherwise support a means for determining a logical block address (LBA) associated with the atomic write operation. In some examples, the local controller 530 may be configured as or otherwise support a means for performing a logic operation on the LBA and a counter value associated with the atomic write operation, where the identifier is determined based at least in part on performing the logic operation. In some examples, the logic operation includes an XOR operation.

In some examples, the access circuitry 535 may be configured as or otherwise support a means for writing data for the atomic write operation from a cache memory to at least a subset of pages of the set of pages. In some examples, the access circuitry 535 may be configured as or otherwise support a means for writing address information for the data to the non-volatile memory in response to writing the data for the atomic write operation to at least the subset of pages of the set of pages.

In some examples, the local controller 530 may be configured as or otherwise support a means for determining, after a power loss and based at least in part on the metadata, the set of pages for the atomic write operation. In some examples, the local controller 530 may be configured as or otherwise support a means for determining a validity status for each page of the set of pages based at least in part on the determining the set of pages, where a completion status for the atomic write operation is based at least in part on the validity status for each page.

In some examples, the transmit circuitry 540 may be configured as or otherwise support a means for communicating to a host system an indication of the completion status for the atomic write operation.

In some examples, the transmit circuitry 540 may be configured as or otherwise support a means for communicating an indication of a maximum amount of data supported for the atomic write operation, where a total amount of data for the atomic write operation is less than or equal to the maximum amount of data.

In some examples, the transmit circuitry 540 may be configured as or otherwise support a means for communicating an indication of an address limitation for the atomic write operation, where a starting logical block address for the atomic write operation is in accordance with the address limitation.

In some examples, the transmit circuitry 540 may be configured as or otherwise support a means for communicating an indication of a granularity of data supported for the atomic write operation, where a total amount of data for the atomic write operation is a multiple of the granularity.

In some examples, to support storing the metadata, the access circuitry 535 may be configured as or otherwise support a means for storing the metadata is stored on a per-page basis for each page of the set of pages.

In some examples, the local controller 530 may be configured as or otherwise support a means for determining, for a non-volatile memory, a set of pages for an atomic write operation in which data associated with a write command is linked together for writing to the non-volatile memory, the determination based at least in part on metadata stored for the set of pages. In some examples, the local controller 530 may be configured as or otherwise support a means for determining, based at least in part on determining the set of pages, whether each page of the set of pages has been written to the non-volatile memory. The transmit circuitry 540 may be configured as or otherwise support a means for communicating to a host system an indication of whether the atomic write operation has been completed based at least in part on determining whether each page of the set of pages has been written to the non-volatile memory.

In some examples, the access circuitry 535 may be configured as or otherwise support a means for storing the metadata in the non-volatile memory in response to receiving the write command. In some examples, the local controller 530 may be configured as or otherwise support a means for determining that the memory system experienced a failure event (e.g., lost power) after storing the metadata, where the set of pages for the atomic write operation are determined based at least in part on determining that the memory system lost power or experienced the failure event.

In some examples, the metadata includes metadata for each page of the set of pages, and the local controller 530 may be configured as or otherwise support a means for determining that the metadata for each page of the set of pages has a same value, where the set of pages for the atomic write operation is determined based at least in part on the metadata for each page of the set of pages having the same value.

In some examples, to support determining whether each page has been written, the local controller 530 may be configured as or otherwise support a means for determining that each page of the set of pages has been written, and where communicating includes. In some examples, to support determining whether each page has been written, the transmit circuitry 540 may be configured as or otherwise support a means for communicating an indication that the atomic write operation has been completed.

In some examples, to support determining whether each page has been written, the local controller 530 may be configured as or otherwise support a means for determining that at least one page of the set of pages has not been written, and where communicating includes. In some examples, to support determining whether each page has been written, the transmit circuitry 540 may be configured as or otherwise support a means for communicating an indication that the atomic write operation has not been completed.

In some examples, the access circuitry 535 may be configured as or otherwise support a means for writing, to the set of pages based at least in part on the atomic write operation not being completed, data that was in the set of pages before the atomic write operation. In some examples, the access circuitry 535 may be configured as or otherwise support a means for writing, to the non-volatile memory based at least in part on the atomic write operation not being completed, address information for the data that was in the set of pages before the atomic write operation.

In some examples, the metadata includes an identifier for the atomic write operation and an indication of an amount of data for the atomic write operation.

In some examples, the local controller 530 may be configured as or otherwise support a means for incrementing a value of a counter based at least in part on receiving the write command, where the identifier is based at least in part on the value of the counter.

In some examples, the local controller 530 may be configured as or otherwise support a means for determining a set of pages for an atomic write operation in which data associated with a write command is linked together for writing to a non-volatile memory. In some examples, the access circuitry 535 may be configured as or otherwise support a means for writing, to the non-volatile memory, metadata that indicates the set of pages is associated with the atomic write operation. In some examples, the local controller 530 may be configured as or otherwise support a means for determining, based at least in part on the metadata, whether each page of the set of pages has been written with data for the atomic write operation. In some examples, the transmit circuitry 540 may be configured as or otherwise support a means for communicating to a host system an indication of a completion status for the atomic write operation based at least in part on determining whether each page of the set of pages has been written with the data for the atomic write operation.

In some examples, the local controller 530 may be configured as or otherwise support a means for determining a validity status for each page of the set of pages based at least in part on metadata, where determining whether each page of the set of pages has been written is based at least in part on the validity status for each page.

In some examples, the local controller 530 may be configured as or otherwise support a means for determining that a failure event has occurred since writing the metadata. In some examples, the local controller 530 may be configured as or otherwise support a means for using the metadata to determine the set of pages for the atomic write operation based at least in part on determining that the failure event has occurred.

In some examples, to support determining whether each page of the set of pages has been written, the local controller 530 may be configured as or otherwise support a means for determining that each page of the set of pages has been written with the data for the atomic write operation, where the completion status indicates that the atomic write procedure has been completed.

In some examples, to support determining whether each page of the set of pages has been written, the local controller 530 may be configured as or otherwise support a means for determining that at least one page of the set of pages has not been written with the data for the atomic write operation, where the completion status indicates that the atomic write procedure has not been completed.

Figure 6:
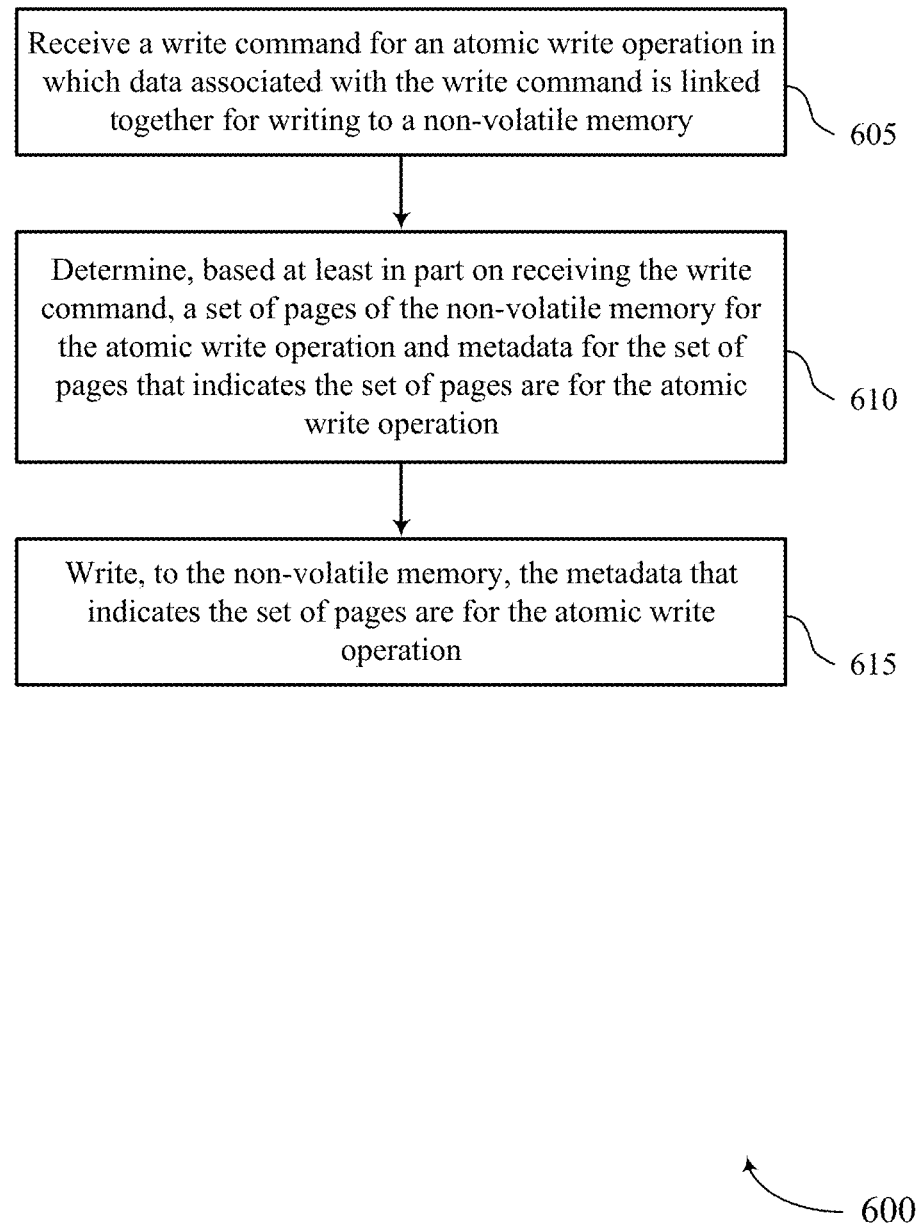
FIGS. 6 through 8 show flowcharts illustrating a method or methods that support techniques for atomic write operations in accordance with examples as disclosed herein.

FIG. 6 shows a flowchart illustrating a method 600 that supports techniques for atomic write operations in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving a write command for an atomic write operation in which data associated with the write command is linked together for writing to a non-volatile memory. The operations of 605 may be performed in accordance with examples as disclosed herein. In some examples, aspects of the operations of 605 may be performed by a receive circuitry 525 as described with reference to FIG. 5.

At 610, the method may include determining, based at least in part on receiving the write command, a set of pages of the non-volatile memory for the atomic write operation and metadata for the set of pages that indicates the set of pages are for the atomic write operation. The operations of 610 may be performed in accordance with examples as disclosed herein. In some examples, aspects of the operations of 610 may be performed by a local controller 530 as described with reference to FIG. 5.

At 615, the method may include writing, to the non-volatile memory, the metadata that indicates the set of pages are for the atomic write operation. The operations of 615 may be performed in accordance with examples as disclosed herein. In some examples, aspects of the operations of 615 may be performed by an access circuitry 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for receiving a write command for an atomic write operation in which data associated with the write command is linked together for writing to a non-volatile memory; determining, based at least in part on receiving the set of write commands, a set of pages of the non-volatile memory for the atomic write operation and metadata for the set of pages that indicates the set of pages are for the atomic write operation; and writing, to the non-volatile memory, the metadata that indicates the set of pages are for the atomic write operation.

Aspect 2: The apparatus of aspect 1, further including operations, features, circuitry, logic, means, or instructions, or any combination thereof for the metadata includes an identifier for the atomic write operation and an amount of data for the atomic write operation.

Aspect 3: The apparatus of aspect 2, further including operations, features, circuitry, logic, means, or instructions, or any combination thereof for determining a logical block address (LBA) associated with the atomic write operation and performing a logic operation on the LBA and a counter value associated with the atomic write operation, where the identifier is determined based at least in part on performing the logic operation.

Aspect 4: The apparatus of aspect 3, further including operations, features, circuitry, logic, means, or instructions, or any combination thereof for the logic operation includes an XOR operation.

Aspect 5: The apparatus of any of aspects 1 through 4, further including operations, features, circuitry, logic, means, or instructions, or any combination thereof for each write command of the set of write commands, except a last write command of the set of write commands, includes a flag indicating that a subsequent write command of the set of write commands is for the atomic write operation.

Aspect 6: The apparatus of any of aspects 1 through 5, further including operations, features, circuitry, logic, means, or instructions, or any combination thereof for writing data for the atomic write operation from a cache memory to at least a subset of pages of the set of pages and writing address information for the data to the non-volatile memory in response to writing the data for the atomic write operation to at least the subset of pages of the set of pages.

Aspect 7: The apparatus of any of aspects 1 through 6, further including operations, features, circuitry, logic, means, or instructions, or any combination thereof for determining, after a power loss and based at least in part on the metadata, the set of pages for the atomic write operation and determining a validity status for each page of the set of pages based at least in part on the determining the set of pages, where a completion status for the atomic write operation is based at least in part on the validity status for each page.

Aspect 8: The apparatus of aspect 7, further including operations, features, circuitry, logic, means, or instructions, or any combination thereof for communicating to a host system an indication of the completion status for the atomic write operation.

Aspect 9: The apparatus of any of aspects 1 through 8, further including operations, features, circuitry, logic, means, or instructions, or any combination thereof for communicating an indication of a maximum amount of data supported for the atomic write operation, where a total amount of data for the atomic write operation is less than or equal to the maximum amount of data.

Aspect 10: The apparatus of any of aspects 1 through 9, further including operations, features, circuitry, logic, means, or instructions, or any combination thereof for communicating an indication of an address limitation for the atomic write operation, where a starting logical block address for the atomic write operation is in accordance with the address limitation.

Aspect 11: The apparatus of any of aspects 1 through 10, further including operations, features, circuitry, logic, means, or instructions, or any combination thereof for communicating an indication of a granularity of data supported for the atomic write operation, where a total amount of data for the atomic write operation is a multiple of the granularity.

Aspect 12: The apparatus of any of aspects 1 through 11 where storing the metadata, further includes operations, features, circuitry, logic, means, or instructions, or any combination thereof for storing the metadata is stored on a per-page basis for each page of the set of pages.

Figure 7:
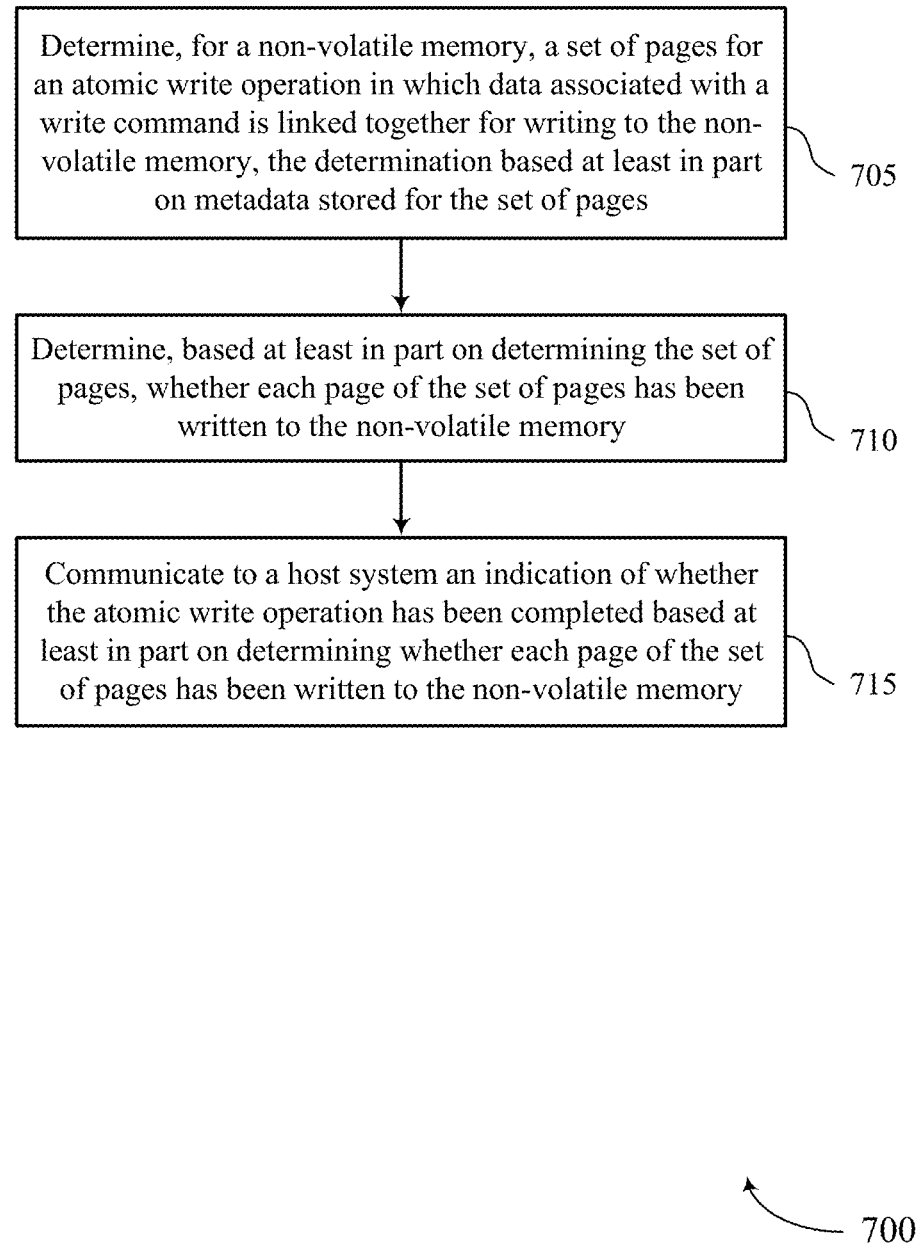

FIG. 7 shows a flowchart illustrating a method 700 that supports techniques for atomic write operations in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 705, the method may include determining, for a non-volatile memory, a set of pages for an atomic write operation in which data associated with a write command is linked together for writing to the non-volatile memory, the determination based at least in part on metadata stored for the set of pages. The operations of 705 may be performed in accordance with examples as disclosed herein. In some examples, aspects of the operations of 705 may be performed by a local controller 530 as described with reference to FIG. 5.

At 710, the method may include determining, based at least in part on determining the set of pages, whether each page of the set of pages has been written to the non-volatile memory. The operations of 710 may be performed in accordance with examples as disclosed herein. In some examples, aspects of the operations of 710 may be performed by a local controller 530 as described with reference to FIG. 5.

At 715, the method may include communicating to a host system an indication of whether the atomic write operation has been completed based at least in part on determining whether each page of the set of pages has been written to the non-volatile memory. The operations of 715 may be performed in accordance with examples as disclosed herein. In some examples, aspects of the operations of 715 may be performed by a transmit circuitry 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor), or any combination thereof for performing the following aspects of the present disclosure:

Aspect 13: The apparatus, including features, circuitry, logic, means, or instructions, or any combination thereof for determining, for a non-volatile memory, a set of pages for an atomic write operation in which data associated with a write command is linked together for writing to the non-volatile memory, the determination based at least in part on metadata stored for the set of pages; determining, based at least in part on determining the set of pages, whether each page of the set of pages has been written to the non-volatile memory; and communicating to a host system an indication of whether the atomic write operation has been completed based at least in part on determining whether each page of the set of pages has been written to the non-volatile memory.

Aspect 14: The apparatus of aspect 13, further including operations, features, circuitry, logic, means, or instructions, or any combination thereof for storing the metadata in the non-volatile memory in response to receiving the write command and determining that the memory system experienced a failure event after storing the metadata, where the set of pages for the atomic write operation are determined based at least in part on determining that the memory system experienced the failure event.

Aspect 15: The apparatus of any of aspects 13 through 14 where the metadata includes metadata for each page of the set of pages and the method, apparatuses, and non-transitory computer-readable medium, further includes operations, features, circuitry, logic, means, or instructions, or any combination thereof for determining that the metadata for each page of the set of pages has a same value, where the set of pages for the atomic write operation is determined based at least in part on the metadata for each page of the set of pages having the same value.

Aspect 16: The apparatus of any of aspects 13 through 15 where determining whether each page has been written, further includes operations, features, circuitry, logic, means, or instructions, or any combination thereof for determining that each page of the set of pages has been written, and where communicating includes and communicating an indication that the atomic write operation has been completed.

Aspect 17: The apparatus of any of aspects 13 through 16 where determining whether each page has been written, further includes operations, features, circuitry, logic, means, or instructions, or any combination thereof for determining that at least one page of the set of pages has not been written, and where communicating includes and communicating an indication that the atomic write operation has not been completed.

Aspect 18: The apparatus of aspect 17, further including operations, features, circuitry, logic, means, or instructions, or any combination thereof for writing, to the set of pages based at least in part on the atomic write operation not being completed, data that was in the set of pages before the atomic write operation and writing, to the non-volatile memory based at least in part on the atomic write operation not being completed, address information for the data that was in the set of pages before the atomic write operation.

Aspect 19: The apparatus of any of aspects 13 through 18, further including operations, features, circuitry, logic, means, or instructions, or any combination thereof for the metadata includes an identifier for the atomic write operation and an indication of an amount of data for the atomic write operation.

Aspect 20: The apparatus of aspect 19, further including operations, features, circuitry, logic, means, or instructions, or any combination thereof for incrementing a value of a counter based at least in part on receiving the write command, where the identifier is based at least in part on the value of the counter.

Figure 8:
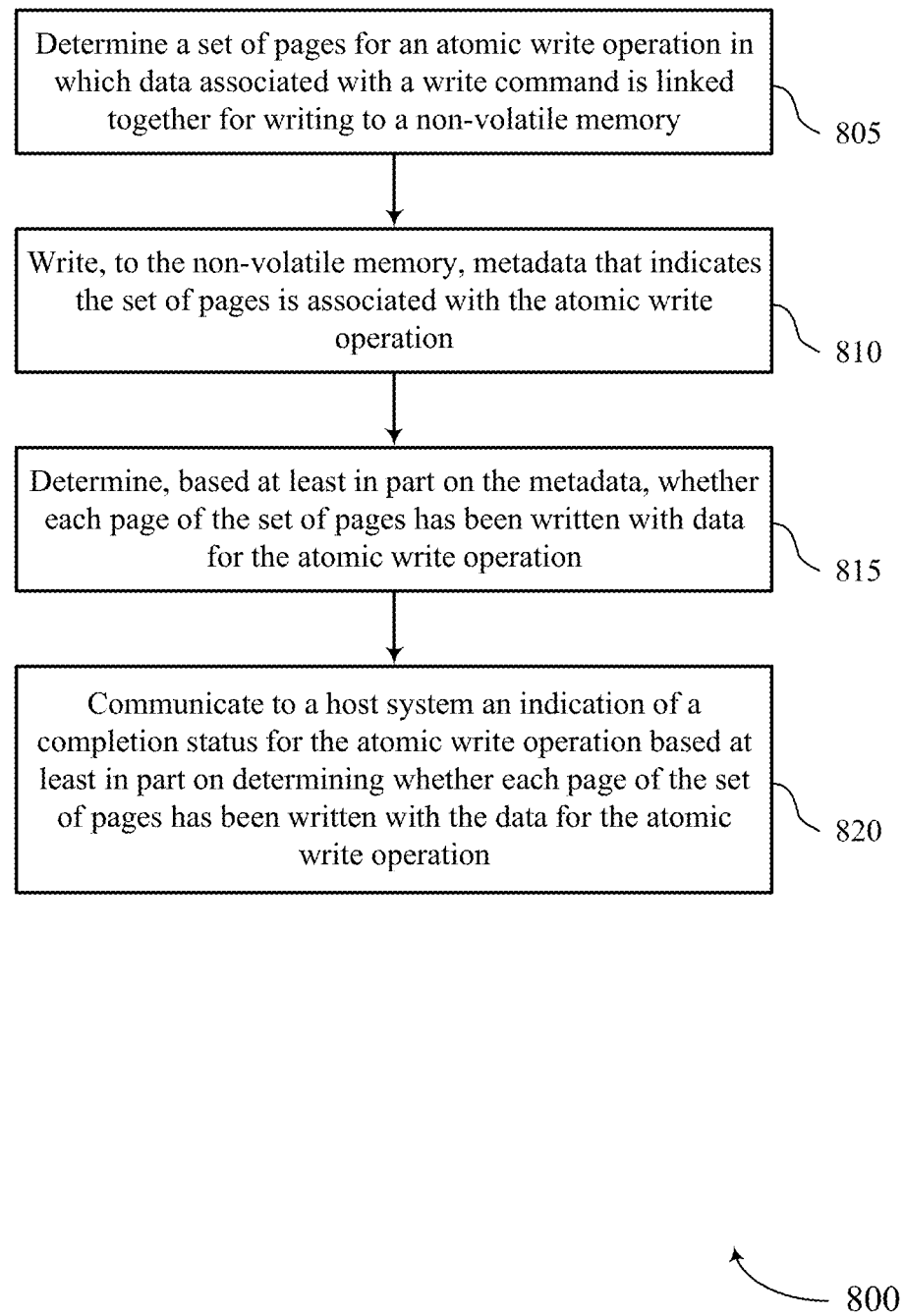

FIG. 8 shows a flowchart illustrating a method 800 that supports techniques for atomic write operations in accordance with examples as disclosed herein. The operations of method 800 may be implemented by a memory system or its components as described herein. For example, the operations of method 800 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 805, the method may include determining a set of pages for an atomic write operation in which data associated with a write command is linked together for writing to a non-volatile memory. The operations of 805 may be performed in accordance with examples as disclosed herein. In some examples, aspects of the operations of 805 may be performed by a local controller 530 as described with reference to FIG. 5.

At 810, the method may include writing, to the non-volatile memory, metadata that indicates the set of pages is associated with the atomic write operation. The operations of 810 may be performed in accordance with examples as disclosed herein. In some examples, aspects of the operations of 810 may be performed by an access circuitry 535 as described with reference to FIG. 5.

At 815, the method may include determining, based at least in part on the metadata, whether each page of the set of pages has been written with data for the atomic write operation. The operations of 815 may be performed in accordance with examples as disclosed herein. In some examples, aspects of the operations of 815 may be performed by a local controller 530 as described with reference to FIG. 5.

At 820, the method may include communicating to a host system an indication of a completion status for the atomic write operation based at least in part on determining whether each page of the set of pages has been written with the data for the atomic write operation. The operations of 820 may be performed in accordance with examples as disclosed herein. In some examples, aspects of the operations of 820 may be performed by a transmit circuitry 540 as described with reference to FIG. 5.

In some examples, an apparatus as described herein may perform a method or methods, such as the method 800. The apparatus may include, features, circuitry, logic, means, or instructions (e.g., a non-transitory computer-readable medium storing instructions executable by a processor), or any combination thereof for performing the following aspects of the present disclosure:

Aspect 21: The apparatus, including features, circuitry, logic, means, or instructions, or any combination thereof for determining a set of pages for an atomic write operation in which data associated with a write command is linked together for writing to a non-volatile memory; writing, to the non-volatile memory, metadata that indicates the set of pages is associated with the atomic write operation; determining, based at least in part on the metadata, whether each page of the set of pages has been written with data for the atomic write operation; and communicating to a host system an indication of a completion status for the atomic write operation based at least in part on determining whether each page of the set of pages has been written with the data for the atomic write operation.

Aspect 22: The apparatus of aspect 21, further including operations, features, circuitry, logic, means, or instructions, or any combination thereof for determining a validity status for each page of the set of pages based at least in part on metadata, where determining whether each page of the set of pages has been written is based at least in part on the validity status for each page.

Aspect 23: The apparatus of any of aspects 21 through 22, further including operations, features, circuitry, logic, means, or instructions, or any combination thereof for determining that a failure event has occurred since writing the metadata and using the metadata to determine the set of pages for the atomic write operation based at least in part on determining that the failure event has occurred.

Aspect 24: The apparatus of any of aspects 21 through 23 where determining whether each page of the set of pages has been written, further includes operations, features, circuitry, logic, means, or instructions, or any combination thereof for determining that each page of the set of pages has been written with the data for the atomic write operation, where the completion status indicates that the atomic write procedure has been completed.

Aspect 25: The apparatus of any of aspects 21 through 24 where determining whether each page of the set of pages has been written, further includes operations, features, circuitry, logic, means, or instructions, or any combination thereof for determining that at least one page of the set of pages has not been written with the data for the atomic write operation, where the completion status indicates that the atomic write procedure has not been completed.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory; and
   a controller coupled with the memory and configured to cause the apparatus to:
   select a set of pages for storing data associated with a write operation;
   write, before writing the data to the set of pages, a respective first indication to each page in the set of pages, wherein the respective first indication for each page in the set of pages indicates that the page has been selected for storing the data;
   read, in response to a failure event, a respective second indication from each page in the set of pages in accordance with the respective first indication indicating that each page in the set of pages has been selected for storing the data, wherein the respective second indication for each page in the set of pages indicates whether a respective portion of the data has been written to the page; and
   transmit an indication of a completion status for the write operation based at least in part on whether, for each page in the set of pages, the respective second indication of the respective second indications indicates that the respective portion of the data has been written to the page.

2. The apparatus of claim 1, wherein the controller is further configured to:
   read, in response to the failure event, a plurality of pages comprising the set of pages; and
   identify, based at least in part on reading the plurality of pages, the respective first indications in the set of pages, wherein the controller is configured to read the respective second indications from the set of pages based at least in part on the respective first indications being identified in the set of pages.

3. The apparatus of claim 1, wherein the controller is further configured to:
   determine, based at least in part on reading the respective second indications from the set of pages, that each page of the set of pages is storing its respective portion of the data, wherein the indication of the completion status indicates that the write operation was successfully completed before the failure event based at least in part on the determining.

4. The apparatus of claim 1, wherein the controller is further configured to:
   determine, based at least in part on reading the respective second indications from the set of pages, that one or more pages of the set of pages is not storing its respective portion of the data, wherein the indication of the completion status indicates that the write operation failed based at least in part on the determining.

5. The apparatus of claim 1, wherein the data comprises a plurality of portions, wherein each portion of the plurality of portions is associated with a respective page of the set of pages, and wherein each portion of the plurality of portions is linked together for writing to the memory.

6. The apparatus of claim 1, wherein the write operation is an atomic write operation.

7. The apparatus of claim 1, wherein the controller is further configured to:
   identify, after writing the respective first indications to each page in the set of pages, an occurrence of the failure event, wherein the respective first indications and the respective second indications are read from each page in the set of pages in response to the failure event.

8. The apparatus of claim 1, wherein the failure event is an unexpected power loss, an expected power loss, an unexpected power drop, or an expected power drop.

9. A method, comprising:
   receiving a write command for an atomic write operation in which data associated with the write command is linked together for writing to a memory;
   determining, based at least in part on receiving the write command, metadata for the atomic write operation, and a set of pages of the memory for storing the data associated with the atomic write operation;
   writing, to each page in the set of pages for storing the data associated with the atomic write operation, and before writing any of the data to the set of pages, the metadata to indicate that the page is in the set of pages for storing the data associated with the atomic write operation;
   writing, to a page of the set of pages based at least in part on writing a subset of the data to the page, validity information indicating that at least some of the data has been successfully written to the page of the set of pages; and
   determining, in response to a failure event and based at least in part on the validity information, whether each page of the set of pages has been written with a respective amount of the data for the atomic write operation.

10. The method of claim 9, wherein the metadata comprises an identifier for the atomic write operation and an amount of data for the atomic write operation.

11. The method of claim 9, further comprising:
    writing the data for the atomic write operation from a cache memory to the set of pages; and
    writing address information for the data to the memory in response to writing the data for the atomic write operation to the set of pages.

12. The method of claim 9, wherein the failure event comprises a power loss, and wherein the method further comprises:
    determining, after the power loss and based at least in part on the metadata, the set of pages for the atomic write operation; and
    determining the validity information for the page of the set of pages based at least in part on determining the set of pages, wherein a completion status for the atomic write operation is based at least in part on the validity information.

13. The method of claim 9, further comprising:
    communicating an indication of a maximum amount of data supported for the atomic write operation, wherein a total amount of data for the atomic write operation is less than or equal to the maximum amount of data.

14. The method of claim 9, further comprising:
    communicating an indication of an address limitation for the atomic write operation, wherein a starting logical block address for the atomic write operation is based at least in part on the address limitation.

15. The method of claim 9, further comprising:
    communicating an indication of a granularity of data supported for the atomic write operation, wherein a total amount of data for the atomic write operation is a multiple of the granularity.

16. A method, comprising:
determining, in response to a failure event and for an atomic write operation in which data associated with a write command is linked together for writing to a memory, a set of pages previously selected for storing the data associated with the atomic write operation, the determination based at least in part on reading metadata for the atomic write operation, wherein the metadata is stored in each page of the set of pages, and wherein the metadata in a page indicates that page is in the set of pages previously selected for storing the data associated with the atomic write operation; and
communicating an indication of whether the atomic write operation has been completed based at least in part on a determination of whether each page of the set of pages has been written with a respective amount of the data.

17. The method of claim 16, further comprising:
storing the metadata in the set of pages in response to receiving the write command; and
determining that the failure event occurred after storing the metadata.

18. The method of claim 16, further comprising:
determining that the metadata in each page of the set of pages has a same value, wherein the set of pages for the atomic write operation is determined based at least in part on the metadata in each page of the set of pages having the same value.

19. The method of claim 16, further comprising:
determining that each page of the set of pages has been written; and
communicating an indication that the atomic write operation has been completed.

20. The method of claim 16, further comprising:
determining that at least one page of the set of pages has not been written; and
communicating an indication that the atomic write operation has not been completed.

* * * * *